US00RE46744E

(19) United States
(12) Reissued Patent
Ness

(10) Patent Number: US RE46,744 E
(45) Date of Reissued Patent: Mar. 6, 2018

(54) STAPLE REMOVER

(71) Applicant: Anton Paul Ness, Lansdale, PA (US)

(72) Inventor: Anton Paul Ness, Lansdale, PA (US)

(21) Appl. No.: 14/614,106

(22) Filed: Feb. 4, 2015

Related U.S. Patent Documents

Reissue of:
(64) Patent No.: 8,366,076
Issued: Feb. 5, 2013
Appl. No.: 10/978,753
Filed: Nov. 1, 2004

U.S. Applications:
(60) Provisional application No. 60/516,870, filed on Nov. 3, 2003.

(51) Int. Cl.
*B25C 11/00* (2006.01)

(52) U.S. Cl.
CPC ..... *B25C 11/00* (2013.01)

(58) Field of Classification Search
CPC ..... B25C 11/00
USPC ..... 254/18, 28; 227/63
See application file for complete search history.

(56) References Cited

U.S. PATENT DOCUMENTS 2,539,171 A * 1/1951 Yerkes ..... 254/28
3,625,482 A * 12/1971 Viel, III ..... B25C 11/00 254/28
4,205,823 A * 6/1980 Goldy ..... B25C 11/00 254/28
5,653,424 A * 8/1997 Khan ..... B25C 11/00 254/28
6,145,811 A * 11/2000 Cheldin ..... B25C 11/02 254/28
6,224,035 B1 * 5/2001 Parkhe et al. ..... 254/28

OTHER PUBLICATIONS

Three photographs of magnetic staple remover sold by Staples Inc., Framingham, MA 2002.
One photograph of gripper-type staple remover product, manufacturer 2nd date unknown.

* cited by examiner

*Primary Examiner* — Cary Wehner
(74) *Attorney, Agent, or Firm* — Barley Snyder

(57) ABSTRACT

A staple remover (10) for removing a staple (100) from a document (102) and simultaneously capturing the thus-removed staple. The staple remover includes a wedge (18) for prying the staple free from a document without the staple snagging to the wedge, a bin (20) into which the freed staple will fall and, when in the form of a handheld device, an enclosed clearance (26) around the wedge's top or bearing surface that lifts the staple and that is in communication with the bin such that when the remover is immediately tilted front end upwardly as the staple is freed, the staple falls through the clearance and into the bin. The surfaces of the wedge that engage or could possibly engage the staple's leg portions, are adapted to prevent snagging of the staple when freed from the document. The bin could include an opening (24) covered by a cap (22) that is removable to permit emptying.

59 Claims, 9 Drawing Sheets

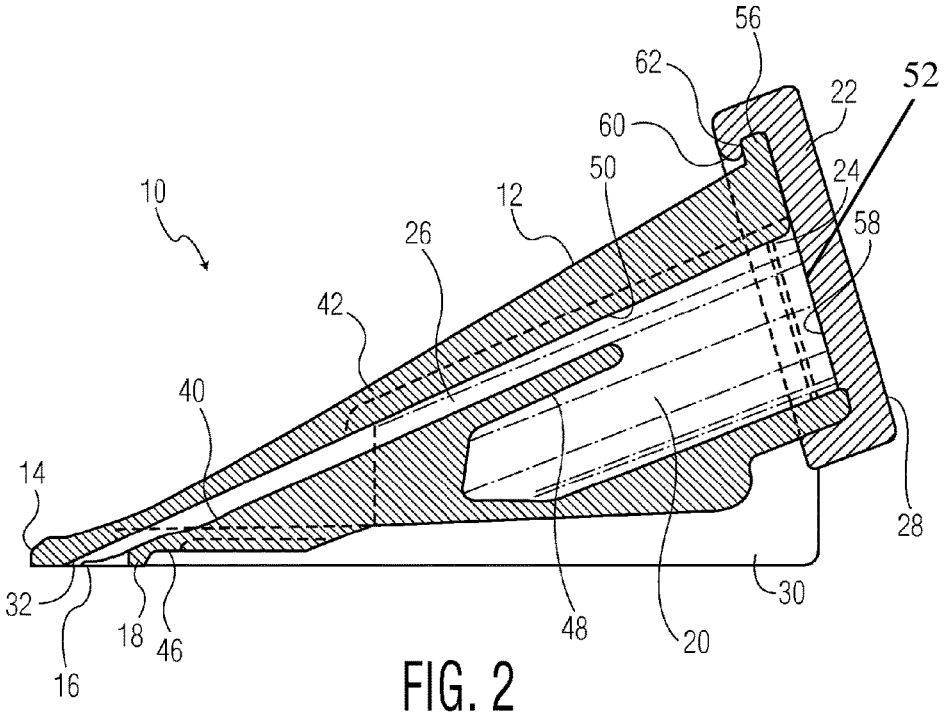
FIG. 2
AMENDED

STAPLE REMOVER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION DATA

This application claims priority from U.S. Provisional Patent Application Ser. No. 60/516,870 filed Nov. 3, 2003.

FIELD OF THE INVENTION

This relates to the field of office accessories and more particularly to implements for removing staples from documents.

BACKGROUND OF THE INVENTION

Manual staple removers for standard staples have conventionally been of two basic types: a hinged device with a pair of grippers that are squeezed toward each other for their leading ends to pry cooperatively beneath the staple after which the device is pulled from the document and lifts the staple vertically from the document; and, a unitary device with an elongate prying lever to be inserted and urged beneath the staple and pushed forwardly as the gradually widening or raising portions of the lever lift the staple until the staple is pried free from the document, and may sometimes be found fastened to the side of a stapling device. The freed staple is then to be discarded, commonly still gripping the remover and requiring manual removal. Each device of the two designs is held in one hand as the document is held by the other. Some staple removers include magnetic portions to temporarily hold the loose staple until manually pulled away and disposed of; but magnets are not advisable near computers, diskettes and the like. In recent years, copying machines have included an inverted wedge affixed thereto for removal of staples, where the document is held inverted and the top of the staple is urged against the wedge leading edge by manually moving the document toward and along the wedge, and the staple is pried loose downwardly until freed.

Commonly some damage may occur to the document that is destapled by these prior art devices. But even more damage has commonly resulted from loose staples falling into the copying machine necessitating frequent and costly repair and maintenance. Desktop damage has also resulted. Additionally, loose staples falling to the carpet commonly snag the carpet and are not easily or assuredly collected in routine carpet vacuuming procedures. And those staples that remain by force fit on the staple removers, must be removed by hand and discarded safely.

A solution to the problem of loose used staples would be greatly beneficial, without using magnets or requiring tedious and careful manual disposal of every staple.

SUMMARY OF THE INVENTION

The present invention is a staple removing device being or including a wedge that pries the staple loose from the document but that is adapted not to permit the legs of the staple to snag thereto when freed from the document.

Preferred forms of the invention include a housing body joined to or surrounding the wedge that captures the staple after the wedge frees the staple from a document. The wedge has a leading edge adapted to be pried beneath the staple's top horizontal section, from which leading edge extends a staple-engaging bearing surface. The surfaces of the wedge that are or could be engaged with the staple's legs when the staple has just been freed from the document, are recessed and/or angled inwardly and upwardly and/or rounded to eliminate snagging by the staple's usually still-partially-deformed legs when the staple is freed from the document, legs that tend to be bent slightly toward each other and not depend orthogonally from the top horizontal section. The staple remover may have a bin section that defines an enclosed staple capture space, and a clearance space adjacent the wedge's bearing surface that communicates with the bin section and that surrounds the wedge to enclose the region entered by the staple when loose. Or, the staple remover could be used in association with a separate bin for capturing the freed staple.

In a first embodiment, the inventive device is handheld and is pushed by the fingers gripping it or by the palm of the hand pressing against a rear, palm-engageable surface of ergonomic design, while a widened bottom skirt portion with a smooth bottom surface rests on the top of the document to be destapled to easily move thereover when pushed, with the document either being hand-held or resting on a support surface such as a desktop. The remover device preferably includes a protective nose portion forwardly of the wedge's leading edge, and includes a pocket extending upwardly from the remover's bottom surface in front of the wedge's leading edge into which the user will first position the top staple portion; preferably the pocket is partially open to the top (or has a clear top cover) to permit visual positioning verification. An enclosed clearance space above the wedge's bearing surface extends rearwardly beneath a top outer wall to a spacious rearward bin section so that the loosened staple can fall through the clearance space into the bin when the remover is then tilted front end upwardly immediately after prying loose the staple. A bin rearward opening has a removable, replaceable cap thereover to permit emptying the bin when desired, and the cap is ergonomic to define the palm-engageable push surface.

In a second embodiment similar to the first, a flat platform accompanies the handheld remover to support the document during destapling; the remover may be tethered to the platform. Such a platform can sit on the desktop to protect the desktop's surface from any marring by the sharp staple ends.

In a third embodiment, a staple remover component is provided to be affixed to copying (or other) machines. The wedge is inverted, and the bin section beneath the wedge collects and retains the freed, loose staple when it falls thereinto. The component may be removable from or at least movable with respect to the bin section to permit emptying of the bin section. In other embodiments, the staple remover may be used with a ballast, or as part of a heavy desktop accessory, with a nonsliding bottom surface, or may be fastend to a wall or other structural entity.

BRIEF DESCRIPTION OF THE DRAWINGS

Embodiments of the invention will now be described by way of reference to the drawings, in which:

FIG. 2 is a longitudinal cross-section elevation view of the remover of FIG. 1;

DETAILED DESCRIPTION OF THE INVENTION

Figure 1:
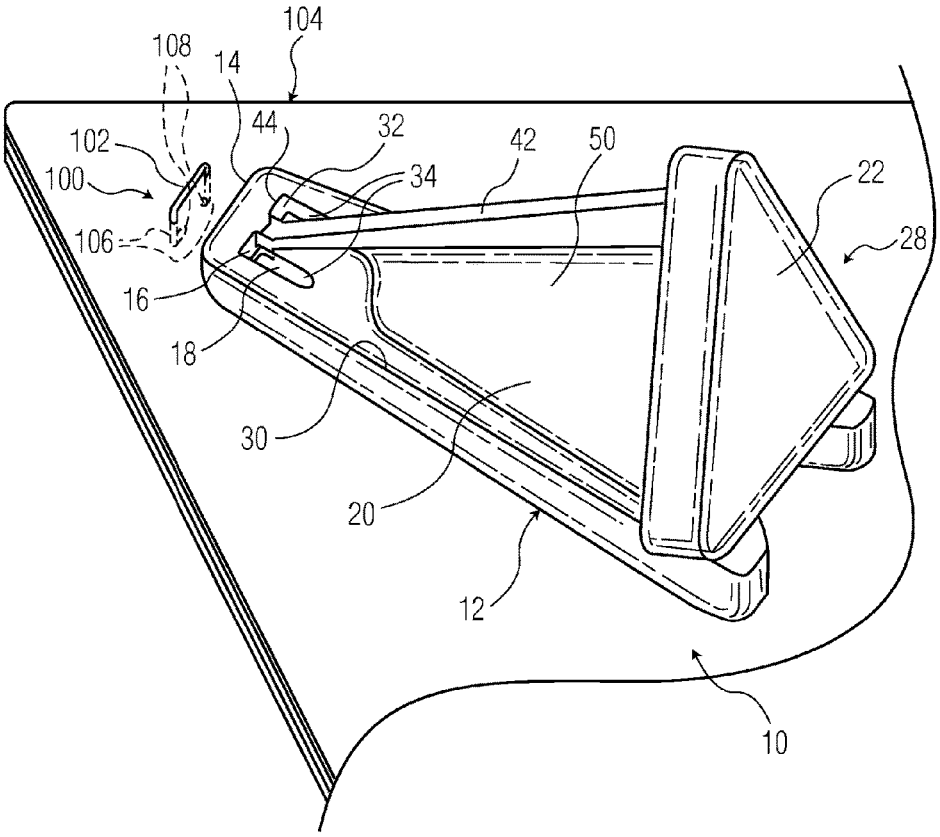
FIG. 1 is an isometric view of a handheld staple remover of the present invention, including a removable palm-engageable cap, positioned above a stapled document.

In FIGS. 1 to 6 is shown a first embodiment of the staple remover of the present invention, including the nonsnagging wedge of the present invention. Remover 10 includes a housing body 12 with a forward nose 14 near which is the leading edge 16 of a wedge 18; a rearward bin section 20 that defines an enclosed staple capture space; a rear cap 22 covering the rear *exterior* opening 24 of the bin section 20; and a clearance 26 that encloses the region above, beside and rearwardly of the wedge 18 in communication with the bin section 20. Remover 10 is pushable relatively along the document's surface by the palm of the hand pressing against a rear, palm-engageable surface 28 of rear cap 22 and has an ergonomic design; a widened bottom skirt portion 30 with smooth outwardly-facing surfaces rests on and easily glides over the top of the document to be destapled, with the document either being handheld or resting on a support surface such as a desktop (or a platform; see FIG. 9).

Figure 3:
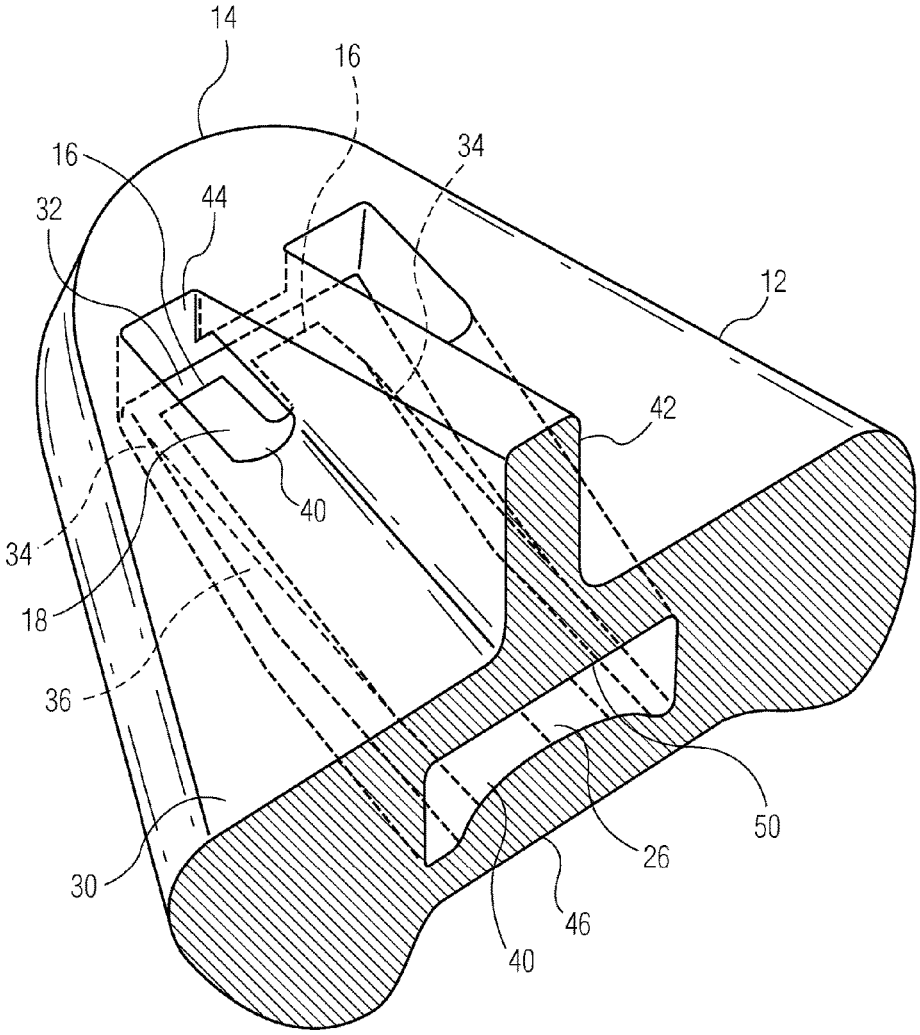
FIG. 3 is an enlarged isometric part-section view of the nose portion of the remover of FIGS. 1 and 2.
Figure 4:
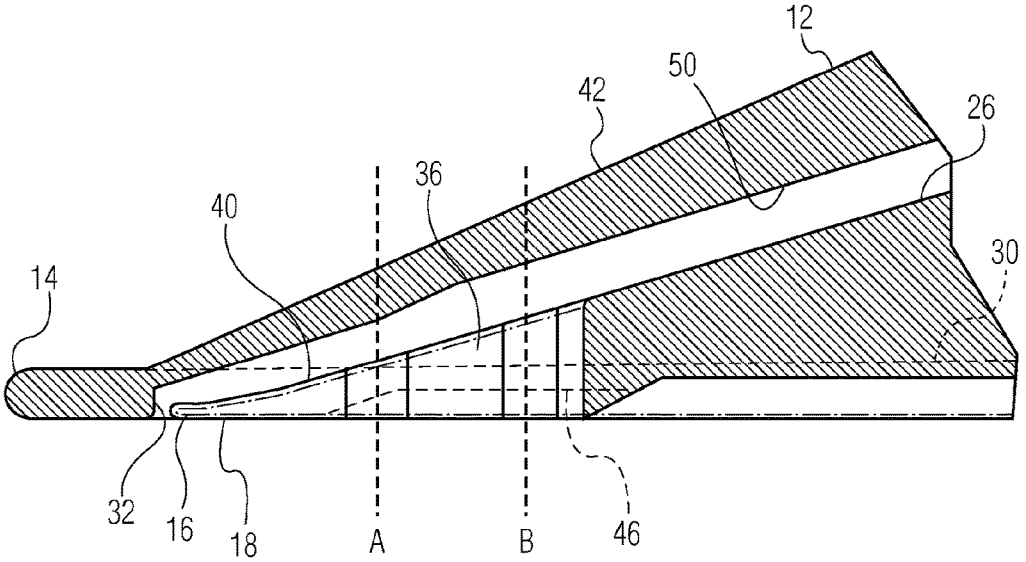
FIG. 4 is an enlarged cross-section side view of the forward end of the remover illustrating the pocket, the leading [end] *edge* of the wedge and one side of the wedge of FIGS. 1 to 3.
Figure 5:
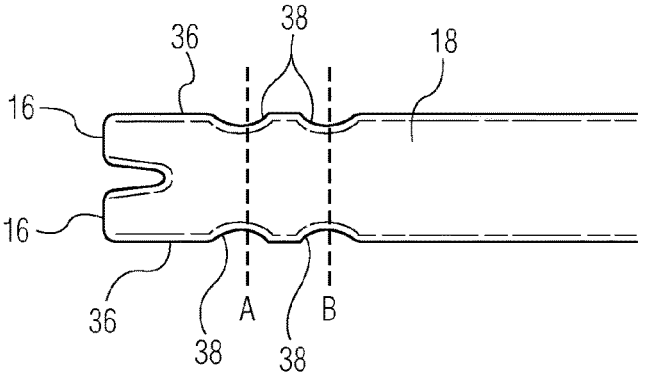
FIG. 5 is a top view of the remover's wedge [front end] *leading edge*.
Figure 6:
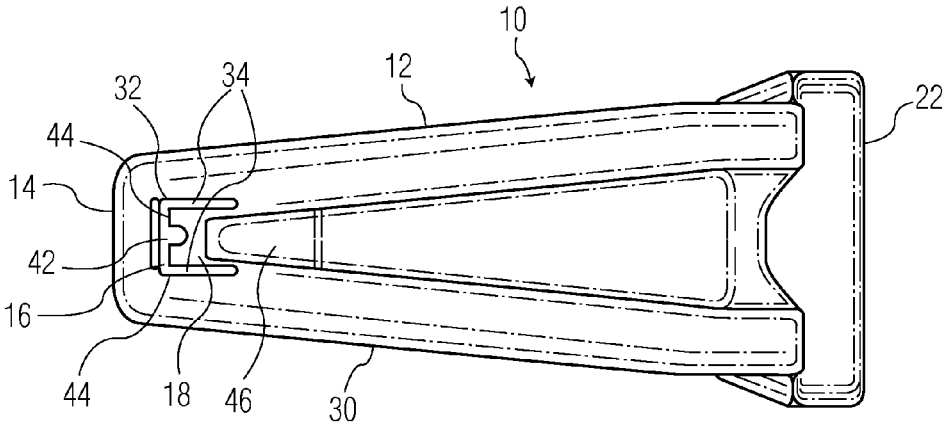
FIG. 6 is a bottom view of the remover of FIGS. 1 to 5.

As best seen in FIGS. 3 to 5, in the forward nose 14 is a transverse pocket 32 that extends upwardly just in front of the wedge leading edge 16 of wedge 18. Pocket 32 is dimensioned to receive fully thereinto the top horizontal section 102 of staple 100 stapled to document 104. Pocket 32 is shown to extend upwardly and partially open onto the top surface of nose 14 to provide for visual verification of staple positioning within the pocket. Optionally, a clear top cover would also permit visual verification. A pair of short narrow channels 34 extend rearwardly from lateral ends of the pocket and beside side surfaces 36 of wedge 18 to accommodate the staple legs 106 during removal. Both pocket 32 and channels 34 communicate upwardly into clearance 26 above the wedge. Openings perforating the bottom surface of the remover need only be the transverse pocket 32 and the short, narrow channels 34.

Forward nose 14 of the staple remover extends forwardly of the leading edge of the wedge, and its bottom *or document engaging* surface engages the top surface of the document generally surrounding the small stapled region to be pressed, along with other bottom *or document engaging* surface portions of the remover, somewhat downwardly as the remover is pushed slidingly forwardly along and somewhat downwardly against the document during use. Additional smooth flat bottom surface portions of the remover are located alongside of the wedge and bin section 20, providing stability for optimal movement of the remover during operation, while all the bottom surface portions of the remover that engage the document are smooth with rounded edges to minimize any damage to the document during staple removal.

The leading edge 16 of wedge 18 is thin (such as about 1 mm or less) in order to pry beneath the horizontal section of the staple which is about 12 mm, and is just narrow enough (about 11 mm) to be inserted between the depending staple legs that extend through respective perforations through the document. Wedge 18 has a top bearing surface (or top bearing surface portions adjacent both sides) 40 for engaging the staple's horizontal section 102. The height of the wedge's top bearing surface (or surfaces) 40, increases rearwardly from its leading edge to lift the top staple section as the remover is pressed forwardly after wedge leading edge 16 pries under the staple; the remover is simply pressed forwardly until the staple is freed from the document, whereafter the remover is quickly [tilted nose] upwardly *tiltable* so that the freed staple enters and falls through clearance [38] *26* and into bin section 20. Top bearing surface 40 may incline at an angle of from 5 to about 25 degrees, more preferably between 8 and 18 degrees. In FIG. 4, top bearing surface 40 is shown to have a slope of about 15 degrees. Preferably, a longitudinal rib 42 along the remover's top wall 50 also traverses the central portion of pocket 32 above the wedge's leading edge 16 to minimize *the chances of* inadvertent escape of the loose staple outwardly through the top of pocket 32 while leaving openings 44 on either side thereof for visual staple positioning verification.

The wedge is shown in FIGS. 2 to 6 to be integral with the material of the remover's housing body 12, which is preferably of plastic material that is selected to be rugged, durable and wear resistant. Referring in particular to FIGS. 4 and 5, the wedge's side surfaces 36 are so dimensioned, and are smooth with their top and bottom edges rounded, all to eliminate snagging by the staple legs 106, whose ends 108 may remain partially deformed even when freed from the document. Side surfaces 36 are angled inwardly and upwardly into the clearance 26, and/or are preferably recessed at recesses 38 an amount about the diameter of a staple, as shown, at least at one location A so that the deformed staple leg ends do not snag nor enter into a force-fit therewith at the moment the staple is freed from the document, so that when remover 10 is immediately tilted nose upwardly the loose staple will fall into clearance 26 and rearwardly into bin section 20.

Location A is positioned at a site spaced a preselected first distance from the wedge leading edge, at that point along the wedge where the side surface elevation has a height about equal to the length of the legs of a standard size staple 100, about 6 mm. Optionally, similar nonsnagging side surfaces are provided at a second location B a preselected second distance where the side surface height is about equal to the elongated leg length of the larger sized staples for thick documents (about 9 mm). Side channels 34 need only extend to just rearwardly of location A (or optional location B). Commonly, the staple 100 may assume a forwardly tilted angle when being lifted by the wedge (as the document skews accordingly), the angle being almost orthogonal to the slope of the top bearing surface 40, so location A (and location B) may begin just forwardly of where the side surface height equals the standard staple leg length(s).

It is also preferable to provide a shallow scalloping 46 into the bottom surface of wedge 18, as seen in FIG. 2. Scalloping 16 provides a relief into which the portion of the document surrounding the staple can be pulled upward by the staple's legs. Thus, the sharp ends of the staple legs when being pivoted downwardly away from the document, will not inadvertently scrape the hand holding the document, or scrape a support surface if the document is resting on a support surface during staple removal. Scalloping 46 could actually begin laterally outwardly of the wedge's side surfaces and incorporate a portion of the bottom of the skirt beside the wedge and the short channels 34, and preferably extends rearwardly some distance or even to the rear end of the remover.

The actual length and shape of the deformed leg end portions varies from document to document: from long, gentle curves in a few-page, thin document; to short, sharply angled leg end portions for a thick document that is almost as thick as the standard staple leg is long. The wedge accommodates these variations with its anti-snagging design: the bottom edge of each wedge side surface 38 is rounded (or even slightly angled inwardly), not sharply right-angled, so that resistance to upward movement of the deformed leg end portion is minimal; and, the bottom edge recess and the angle of the side surface at location A (and location B) eliminate engagement (with any force vector) with the leg end altogether at that moment when the staple is freed and the remover is tilted upwardly, all so that the staple is not inhibited in entering and falling through the clearance and into the bin section.

Figure 7:
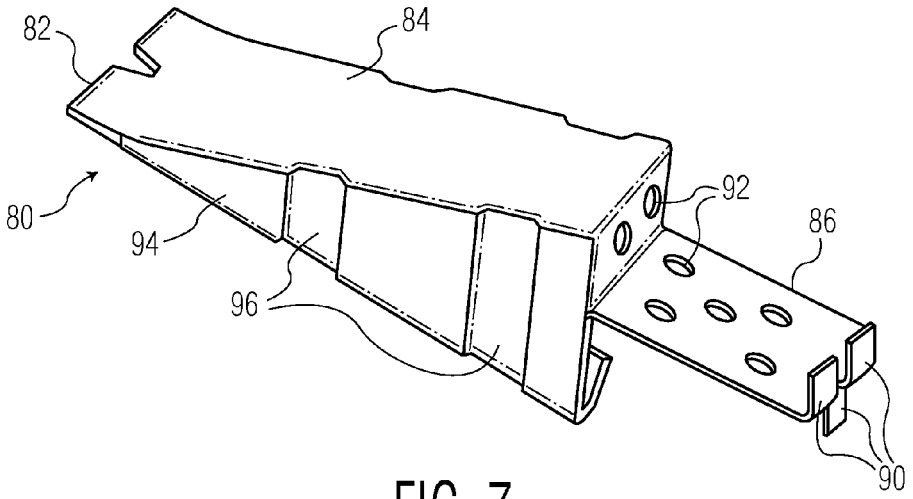
FIG. 7 is an isometric view of a separate metal wedge for use in the remover of FIGS. 1 to 5, adapted for insert-molding.
Figure 8:
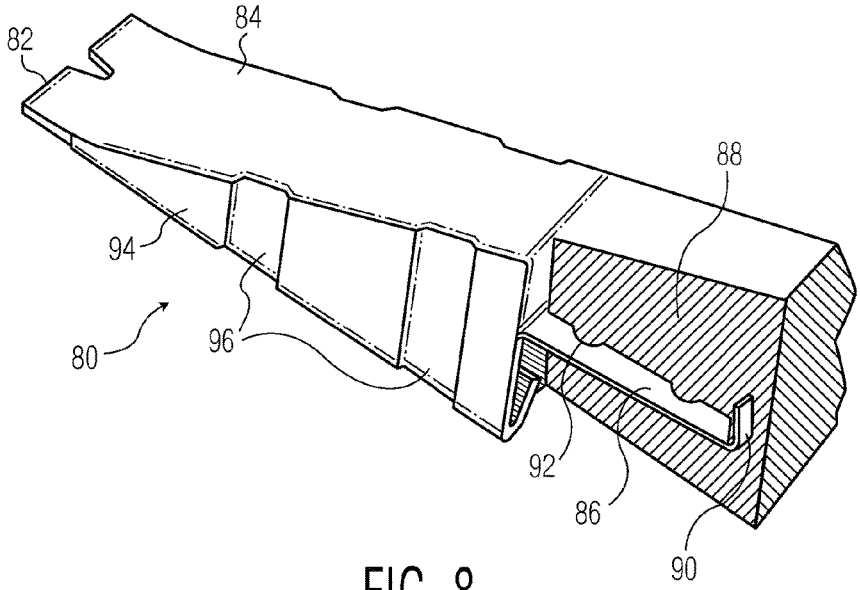
FIG. 8 is a part-section view of the wedge of FIG. 6 molded to the housing body of the remover of FIGS. 1 to 6.

Optionally, as shown in FIGS. 7 and 8, the wedge may be a nonmagnetized metal body 80 such as of stainless steel, either insert-molded to the remover's housing body 12, or secured firmly thereto. As shown, the metal wedge includes the thin leading edge 82 and a top bearing surface 84. A rear securing section 86 may depend from the end of bearing surface 84 and further rearwardly to be insert-molded within a thickened housing body portion 88 and include rear vertical tabs 90 and perforations 92 therethrough for optimal joining to the remover's housing body. Side walls 94 include swaged recesses 96 correlating to recesses 38 in FIGS. 3 and 4.

After the staple has been pried free from the document, the remover is then *to be* quickly tilted *nose end* upwardly to assure that the loose staple falls to the rear of the remover and into the main portion of the staple capture bin section, thus preventing the loose staple from inadvertently falling through the small opening forwardly of the wedge leading edge and the pair of short narrow channels 34. Clearance 26 above and rearwardly of the wedge should be sufficiently wide enough and have sufficient height above the wedge's top bearing surface 40 to define a clearance for a loose staple to freely pass therethrough rearwardly and into the staple capture region when the remover is thus tilted. Preferably, the inner surfaces of both the clearance and bin sections should be so designed to eliminate any snagging of a loose staple when falling rearwardly during tilting or during emptying, respectively.

The interior of the remover is designed at relevant locations to inhibit incidental movement of loose staple in the relative forward direction at any time; thus, an interior wall section 48 extends a selected distance rearwardly and upwardly continuing from the wedge's top bearing surface 40 and defining the bottom of clearance 26, and serves as a partial top cover for bin section 20. An optional feature of the remover could be that the wedge include one or more transverse, low-height ridges (not shown) over its top surface spaced rearwardly from the top bearing surface, and also rearwardly facing ledges (not shown) along the wall 50 defining the top of clearance 26 (and of bin section 20), to inhibit any incidental forward movement of a just-loosened staple prior to being caused to move into the staple bin 20.

Preferably, the staple capture bin section is spacious, sufficient in size to contain about one hundred or so loose, used staples and may be generally, conveniently, tubular or triangular in cross-sectional shape and relatively large in dimension, extending rearwardly with its top wall 50 angled upwardly from the forward end, to a rearward end wall 52 at the remover's palm-engageable section, defined mostly or entirely by large end cap 22 traversing opening 24. The forward nose 14 and other bottom portions of the remover may extend integrally laterally and rearwardly from the base of the staple capture region, to define widened skirt portion 30.

As shown in FIGS. 1 and 2, large rear *or exterior* opening 24 of staple bin section 20 may be circular with a short, rearwardly extending collar 56 that is covered by large rear cap 22. Cap 22 may be temporarily removed to permit emptying the loose staples from the remover, after which the cap is replaced. The rear cap may be of a relatively soft elastomer or synthetic rubber for the comfort of the user when pushing the remover forwardly by the palm of the hand. Rear cap 22 is shown to have a pocket 58 in its front surface that is complementary to the shape of collar 56, with an inner lip 60 that snaps over flange portions 62 around at least most of collar 56 to fasten the cap to the remover in a manner permitting removal and replacement.

To facilitate molding of radially outwardly extending flange portions 62, collar 56 may simply be the ends of the side walls of bin section 20. The shape and size of such an elastomeric (or plastic cap) may be selected from a variety of ergonomic shapes and sizes, and have a general shape complementary to the cross-sectional design of bin section 20. Cap removal may be facilitated by having no flange portions 62 along the bottom extent of collar 56 to be engaged by inner lip 60, so that the bottom side of the cap may easily be pried rearwardly manually. (Optionally, the cap may be plastic and include a threaded circular flange extending from a front side thereof that is threadable onto a correspondingly threaded, nonflanged circular collar 56.)

It is believed that all features of the staple remover body may be defined in a simple molding process wherein two mold halves are simply moved axially apart to enable easy extrication of the molded body from the mold cavity. The optional metal wedge 80 (FIGS. 5 and 6) could be joined to the molded plastic remover body in a conventional insert-molding process. Many plastic and elastomeric materials are known that would be satisfactory for use in fabricating the staple remover of the present invention.

Figure 9:
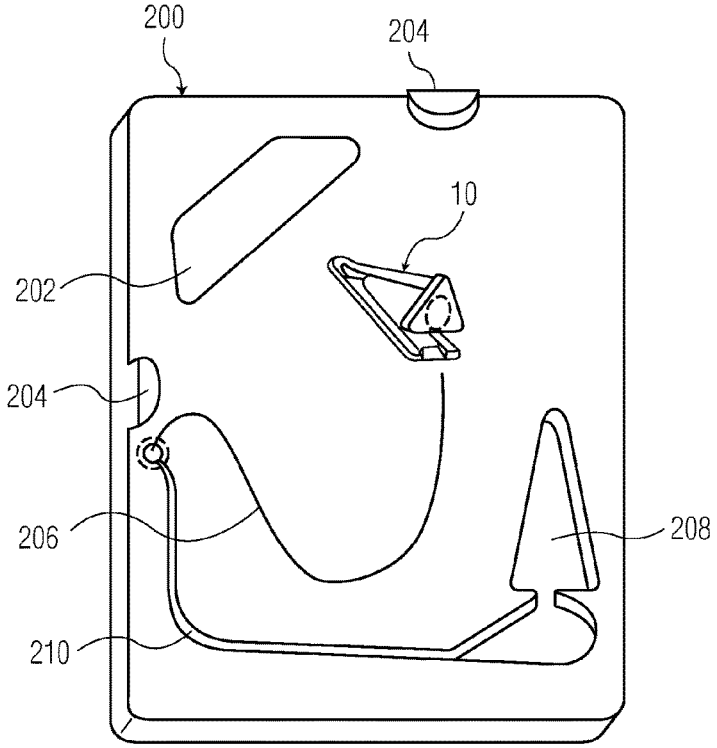
FIG. 9 is an isometric view of the remover of FIGS. 1 to 6 tethered to a document support platform.

Referring now to FIG. 9, optionally providable with the remover is a substantially flat document platform 200 on the top surface of which a stapled document is placed during staple removal; at least the top surface of such a platform would be scratch-resistant to obviate any damage resulting from movement of the staple leg ends during staple removal since the stapled document is being pressed somewhat downwardly during staple removal. Such a platform need not be as large as the document but only large enough to extend beyond the outer perimeter of the staple remover base, and would have a "target area" 202 designating where the stapled portion of the document should be positioned during staple removal, and target area 202 may be incrementally recessed to a depth about equal to the diameter of a standard staple to accommodate the staple leg portions.

Two or more embossments 204 along platform edges near the target area would be abutted by the document edges to hold the document against inadvertent movement during staple removal. The staple remover 10 may preferably be secured to the platform by a strong tether 206. The platform could optionally include a specific recessed resting position 208 for the remover when not in use. Also, platform 200 could include a tether-receiving groove 210 into which the tether could be wiped to prevent incremental snagging when the platform and remover are not being used. The tether could be of a design with enlarged ends (analogous to items used to attach tags to clothing for retail sale), with the ends inserted through corresponding holes in the platform and in the remover.

Figure 10:
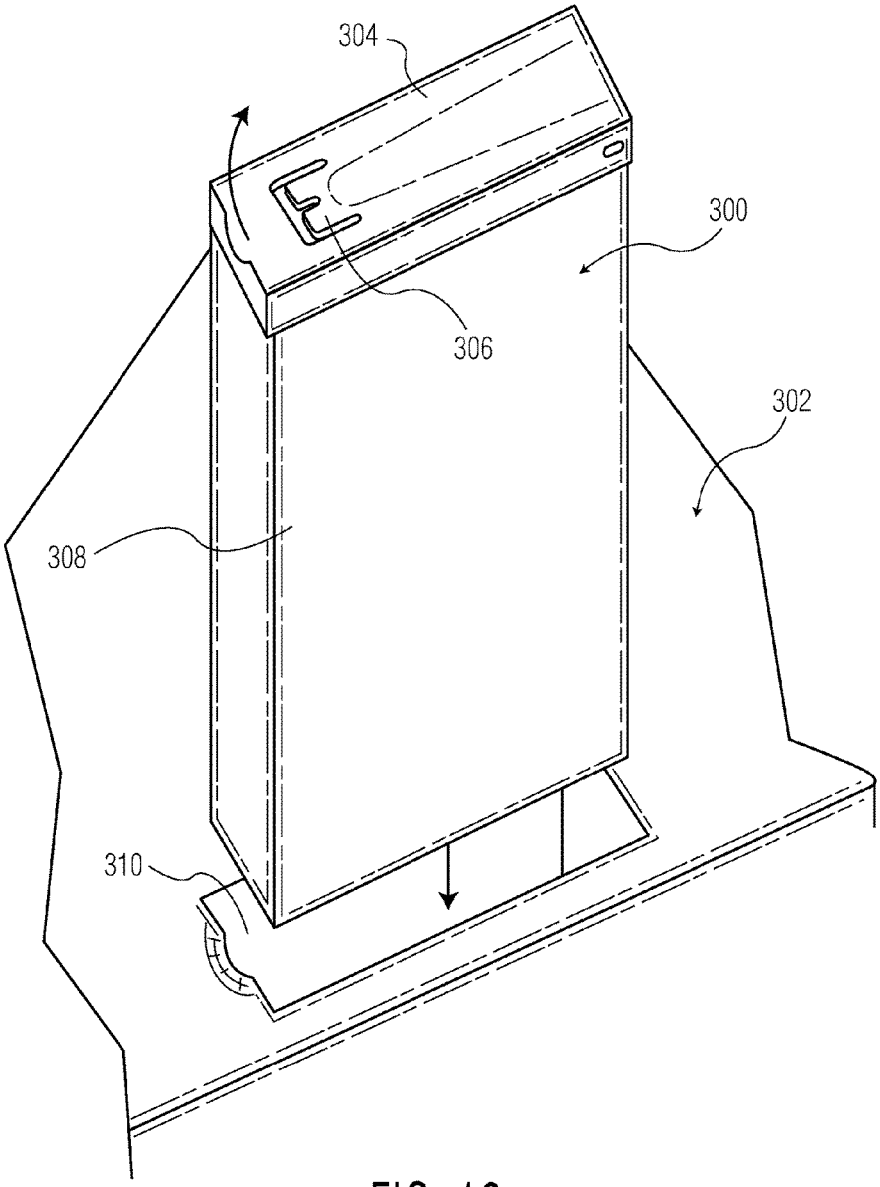
FIG. 10 illustrates a staple remover as a removable component of an office machine in which the staple bin is beneath the wedge.
Figure 11:
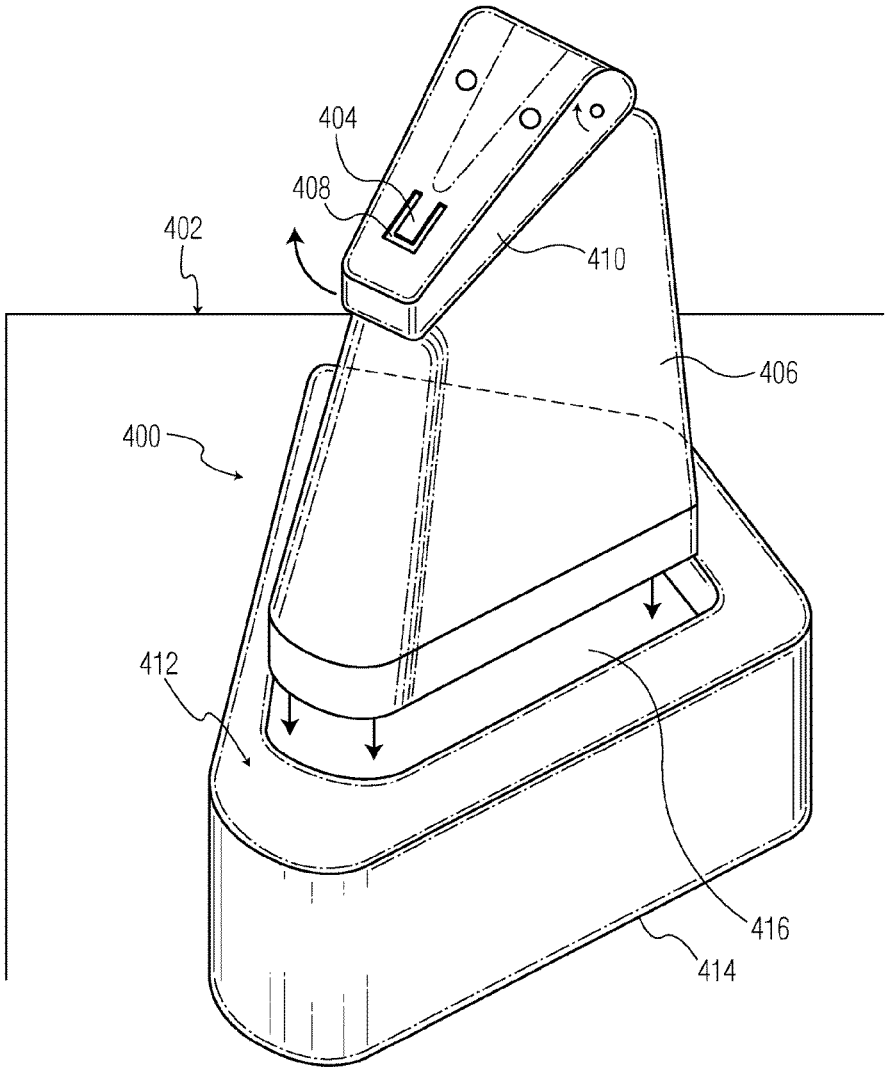
FIG. 11 shows another embodiment of the staple remover similar to that of FIG. 10 of the present invention, for desktop use, nesting into a ballast.
Figure 12:
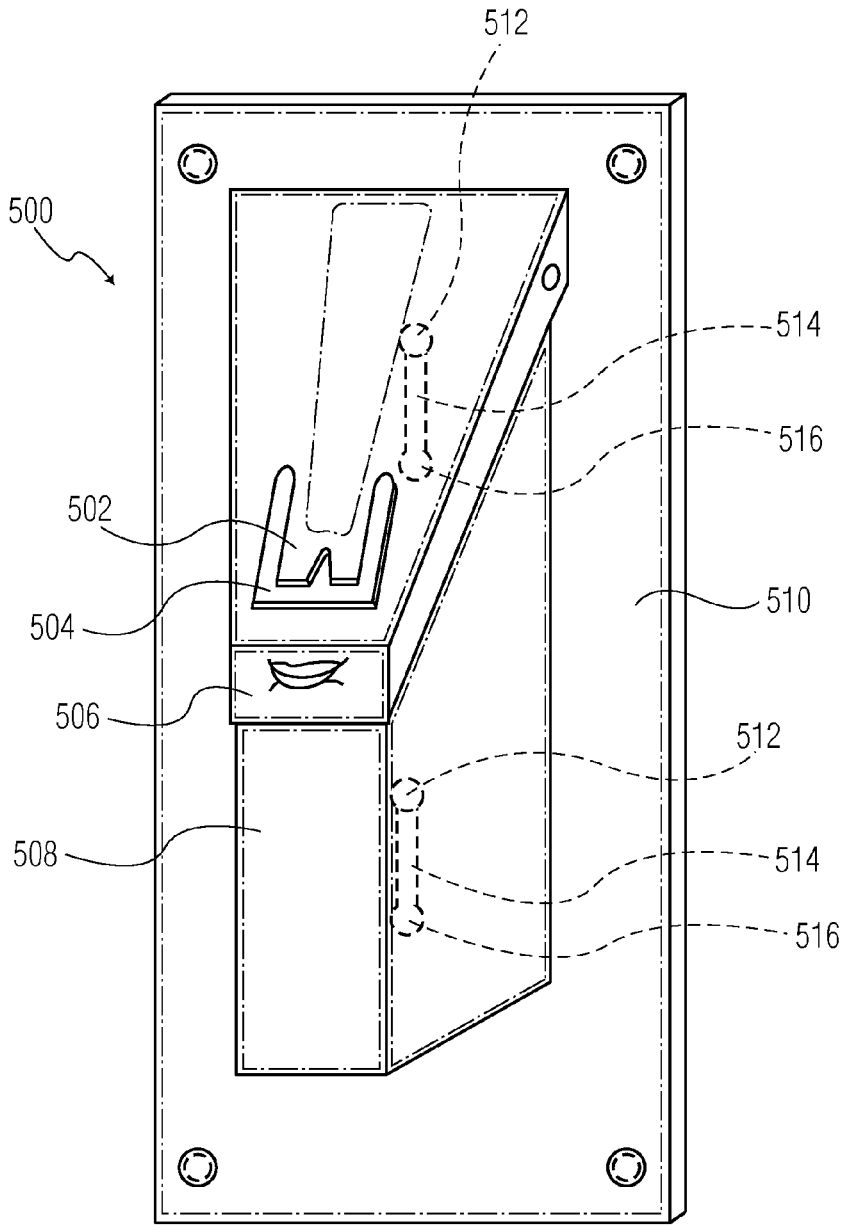
FIG. 12 illustrates a staple remover similar to that of FIG. 10 to be mounted to a post or wall.

With reference to FIGS. 10 to 12, additional embodiments of the staple remover of the present invention are provided that are not handheld for use.

FIG. 10 shows a staple remover 300 that is in the form of a component to be affixed to and/or in an office machine 302 such as a copier whereat documents are commonly unstapled. Staple remover 400 has a lid 304 that includes a staple-removing wedge 306 and is located above a staple bin section 308 across a top opening thereof. Preferably, remover 300 is adapted to be lifted from its nest 310 within the top of the copier for being emptied through its top opening when lid 304 is pivoted upwardly, whereafter lid 304 is closed and snapped shut and remover 300 is replaced in the copier. Lid 304 comprises an integral shield section surrounding the wedge so that the wedge would not pose a hazard, or be exposed to be inadvertently damaged.

With reference to FIG. 11, staple remover 400 for placing on a desktop or other support surface 402. Remover 400 includes a staple-removing wedge 404 that is integral with or affixed to a staple bin section 406 situated beneath the wedge. Wedge 404 is similar to wedge 18 of FIGS. 3 to 8 but inverted, with its leading edge just rearwardly of bin opening 408. Wedge 404 is shown disposed within a lid 410 over a top opening to bin section 406 and could be pivoted open and snapped shut. A document is to be held inverted so that the staple's horizontal section is facing downwardly and just forwardly of the wedge's leading edge; the document is then pulled to seat the wedge leading edge between the staple and the document, and is then pulled farther for the wedge's bottom bearing surface to pry the staple downwardly until freed from the document; the freed staple then falls into the staple bin.

Preferably, staple remover 400 includes a weighty ballast 412 to substantially prevent movement along the support surface 402, and preferably has a nonskid bottom surface 414 of rubber, or having several rubber feet thereunder, to prevent sliding with respect to the support surface when in use. Ballast 412 is preferably a separate component as shown and could be of heavy stone or could also be a container for heavy material or stones or metal spheres of substantial weight. Bin section 406 and lid 410 with wedge 402 could be a unitary component that is simply nested in a pocket 416 in ballast 308, as shown. Optionally, staple remover 400 could be clamped or otherwise fastened to a support surface, preferably in a manner permitting removal therefrom for emptying. Staple remover 400 with its ballast 412 easily lends itself to a decorative or ornamental appearance and can also serve as a paperweight and/or include other pockets for paperclips and the like (not shown).

In FIG. 12, staple remover 500 is attachable to a post or wall and has a downwardly angled lid 502 with a staple-removing wedge 504 just rearwardly of staple-receiving opening 506. Lid 502 is pivotally attached to a bin section 508 across a top opening thereto, for the staple to fall into the bin section when pulled free by the wedge, when an inverted document is manipulated across the top of lid 502 for the wedge to pry the staple free. Remover 500 may be secured to the post or wall by a plate 510 such as with a pair of pins 512 having large heads in short, vertical slots 514 in the rear wall of the bin section, that each have an enlarged pin-receiving opening 516 at their bottom ends. As with remover 400 of FIG. 11, remover 500 easily lends itself to an ornamental or decorative appearance.

Variations and modifications could be devised that are not expressly disclosed herein but are within the spirit of the invention and the scope of the claims.

What I claim is:

1. A staple remover for removing a staple from a document or the like, comprising: a wedge having a leading edge for prying beneath a staple's horizontal section between [said] *a* staple's leg portions, a top bearing surface to pry said staple upwardly when the *staple* remover is urged forwardly, and at least one site a selected distance rearwardly where side surfaces of said wedge are locally recessed to pass said staple's leg portions generally vertically therepast without snagging therewith during [the] *a* removal of said staple from the document and when said staple is freed from the document, wherein said staple remover is free of staple leg-gripping portions*;*

*wherein each said side surface at said at least one site is locally rounded and/or angled upwardly and inwardly, defining a non-snagging surface thereat.*

[2. The staple remover of claim 1, wherein each said side surface at said at least one site is locally rounded and/or recessed and/or angled upwardly and inwardly, defining a non-snagging surface thereat.]

3. The staple remover of claim [2] *1*, wherein said at least one site is positioned where said side surfaces each have a height about equal to a standard length of an associated [said] staple leg, so that when said staple is moved relatively said [common] selected distance, said *staple's* leg portions initially deformed toward each other beneath said document have been pressed indirectly by respective bottoms of said [wedge] side surfaces into relatively vertical orientations releasing from said document while said *top* bearing surface continues to urge upwardly said horizontal [staple] section moving said *staple's* leg portions past respective said side surfaces at said at least one site.

4. The staple remover of claim 3, wherein said wedge includes a second said site positioned where said side surfaces have a second height equal to a second standard length of staple leg, whereby the staple remover is usable with staples of different standard leg length.

5. The staple remover of claim 1, further comprising a body about and joined to said wedge, said [staple remover] body being of an ergonomic size and shape for being hand-held, and said body having a bin section for collecting said staple when freed from said document and further having an enclosed clearance extending from said top bearing surface to said bin section for passage of said [freed] staple thereto and thereinto, when the staple remover is manipulated to tilt front end upwardly immediately as the staple is freed.

6. The staple remover of claim 5, wherein said bin section includes an opening covered by a removable and replaceable cover by which said staple remover may be emptied of freed staples.

7. The staple remover of claim 5, wherein said [staple remover] body further includes a nose section forwardly of said [wedge] leading edge, and a staple-receiving pocket is defined into the bottom of said nose section just forwardly of said [wedge] leading edge for positioning the staple's [top] horizontal section thereinto for said [wedge] leading edge to be pried forwardly therebeneath.

8. The staple remover of claim 7, wherein said [staple remover] body is adapted to permit visual assurance of positioning said staple in said *staple-receiving* pocket from above the *staple* remover without defining an opening of the type that would inadvertently permit escape therethrough of a freed staple.

9. The staple remover of claim 5, wherein a bottom of said wedge is concave or scalloped between said side surfaces.

10. The staple remover of claim 5, wherein said [staple remover] body further comprises a flat smooth-bottomed skirt along and outwardly from said [wedge] side surfaces a small distance, whereby the staple remover is easily glided along said document during staple removal.

11. The staple remover of claim 10, wherein said skirt is adjoined to said [wedge] side surfaces rearwardly of a rearwardmost said at least one site, prohibiting movement therepast of said [staple] *staple's* leg portions.

12. The staple remover of claim 5, wherein the staple remover is tethered to a relatively flat platform for supporting a said document during staple removal.

13. The staple remover of claim 1, wherein said wedge is affixed to a stationary object that includes a bin section beneath said wedge, with said wedge inverted and having said top bearing surface facing downwardly toward said bin section, for a said document to be urged over said wedge for prying and freeing a said staple, which then falls into said bin section.

14. The staple remover of claim 13, wherein said wedge is movable relative to said bin section for emptying said bin section.

15. The staple remover of claim 1, wherein said wedge is affixed to a body section that includes a bin section beneath said wedge, with said wedge inverted and having said top bearing surface facing downwardly toward said bin section, for a said document to be urged over said wedge for prying and freeing a said staple, which then falls into said bin section, and said body section is nestable into a ballast or the like for securing the staple remover against movement during staple removal.

16. The staple remover of claim 1, wherein staple-engaging surfaces of said wedge are nonmagnetized metal.

17. The staple remover of claim 16, wherein said wedge is formed of metal and secured about a plastic wedge-shaped body.

18. The staple remover of claim 17, further comprising a [plastic] housing body integrally joined with said *plastic* wedge-shaped body, said housing body being of an ergonomic size and shape for being hand-held, and said housing body having a bin section for collecting said staple when freed from said document and further having an enclosed clearance extending from said top bearing surface to said bin section for passage of said [freed] staple thereto and thereinto, when the staple remover is manipulated to tilt front end upwardly immediately as the staple is freed.

19. A staple remover for removing a staple from a document or the like, comprising:

a wedge having a [thin] leading edge laterally dimensioned to be less than the distance between leg portions of [a] *the* staple and having a thickness sufficiently small and otherwise appropriately shaped to be easily urged under a top horizontal section of said staple to initiate staple removal as the staple remover is urged forwardly along said document;

said wedge further having a top bearing surface extending rearwardly and upwardly from adjacent said leading edge, and generally vertical side surfaces being generally spaced apart a distance less than said distance between said leg portions of said staple and also extending rearwardly from said leading edge with a common increasing height and substantially in parallel, said top bearing surface urging said top horizontal [staple] section upwardly away from said document during forward movement of the staple remover as bottom edges of said side surfaces press against said document to cause pivoting or deforming of said staple leg portions therebeneath into a vertical orientation to pass upwardly through respective perforations through said document; and at least one respective site spaced a selected distance rearwardly from said [wedge] leading edge whereat said side surfaces are locally recessed to permit said leg portions of said staple to pass generally vertically therepast without snagging therewith as said staple is pried loose from said document, wherein said staple remover is free of staple leg-gripping portions

*wherein each said side surface at said at least one respective site is locally rounded and/or angled upwardly and inwardly, defining a non-snagging surface thereat.*

20. The staple remover of claim 19, wherein said at least one *respective* site is positioned where said side surfaces each have a height about equal to a standard length of an associated [said] staple leg, [and each said side surface thereat is rounded and/or recessed and/or angled upwardly and inwardly, defining a non-snagging surface,] all so that when said staple is moved relatively said selected distance, said leg portions have been pressed into a relatively vertical orientation releasing from said document while said *top* bearing surface continues to urge upwardly said horizontal [staple] section moving said leg portions past respective ones of said at least one *respective* site.

21. The staple remover of claim 19, further comprising a body about and joined to said wedge, said body being of an ergonomic size and shape for being hand-held, and said body having a bin section for collecting said staple when freed from said document and further having an enclosed clearance extending from said top bearing surface to said bin section for passage of said [freed] staple thereto and thereinto, when the staple remover is manipulated to tilt front end upwardly immediately as the staple is freed.

22. The staple remover of claim 21, wherein said body includes a nose section forwardly of said [wedge] leading edge, and a staple-receiving pocket is defined into the bottom of said nose section just forwardly of said [wedge] leading edge for positioning the staple's [top] horizontal section thereinto for said [wedge] leading edge to be pried forwardly therebeneath; said [staple remover] body is adapted to permit visual assurance of positioning said staple in said *staple-receiving* pocket from above the *staple* remover without defining an opening of a type that would inadvertently permit escape therethrough of a freed staple; and said [staple remover] body further comprises a flat smooth-bottomed skirt along and outwardly from said

[wedge] side surfaces a small distance, whereby the staple remover is easily glided along said document during staple removal.

23. A staple remover for removing a staple from a document or the like, comprising:

a wedge having a leading edge for prying beneath a staple's horizontal section between [said] *a* staple's leg portions;

a top bearing surface to pry said staple upwardly when the *staple* remover is urged forwardly; at least one site a selected distance rearwardly where side surfaces of said wedge are locally recessed to pass said staple's leg portions therepast without snagging therewith when said staple is freed from the document; and a body about and joined to said wedge, said [staple remover] body being of an ergonomic size and shape for being hand-held, and said body having a bin section for collecting said staple when freed from said document and further having an enclosed clearance extending from said top bearing surface to said bin section for passage of said [freed] staple thereto and thereinto, when the staple remover is manipulated to tilt front end upwardly immediately as the staple is freed; wherein said [staple remover] body further includes a nose section forwardly of said [wedge] leading edge, and a staple-receiving pocket is defined into the bottom of said nose section just forwardly of said [wedge] leading edge for positioning the staple's top horizontal section thereinto for said [wedge] leading edge to be pried forwardly therebeneath.

24. The staple remover according to claim 23, wherein said [staple remover] body is adapted to permit visual assurance of positioning said staple in said *staple-receiving* pocket from above the *staple* remover without defining an opening of the type that would inadvertently permit escape therethrough of a freed staple.

25. A staple remover for removing a staple from a document or the like, comprising:

a wedge having a leading edge for prying beneath a staple's horizontal section between [said] *a* staple's leg portions;

a top bearing surface to pry said staple upwardly when the *staple* remover is urged forwardly;

at least one site a selected distance rearwardly where side surfaces of said wedge are locally recessed to pass said staple's leg portions therepast without snagging therewith when said staple is freed from the document; and a body about and joined to said wedge, said [staple remover] body being of an ergonomic size and shape for being hand-held, and said body having a bin section *with an opening* for collecting said staple when freed from said document and *covered by a removable and replaceable cover by which said staple remover may be emptied of freed staples and* further having an enclosed clearance extending from said top bearing surface to said bin section for passage of said [freed] staple thereto and thereinto, when the staple remover is manipulated to tilt front end upwardly immediately as the staple is freed;

wherein a bottom of said wedge is concave or scalloped between said side surfaces.

26. A staple remover for removing a staple from a document or the like, comprising:

a wedge having a [thin] leading edge laterally dimensioned to be less than the distance between leg portions of a *the* staple and having a thickness sufficiently small and otherwise appropriately shaped to be easily urged under a top horizontal section of said staple to initiate staple removal as the staple remover is urged forwardly along said document; said wedge further having a top bearing surface extending rearwardly and upwardly from adjacent said leading edge, and generally vertical side surfaces being generally spaced apart a distance less than said distance between said leg portions of said staple and also extending rearwardly from said leading edge with a common increasing height and substantially in parallel, said top bearing surface urging said top horizontal [staple] section upwardly away from said document during forward movement of the staple remover as bottom edges of said side surfaces press against said document to cause pivoting or deforming of said staple leg portions therebeneath into a vertical orientation to pass upwardly through respective perforations through said document;

at least one respective site spaced a selected distance rearwardly from said [wedge] leading edge whereat said side surfaces are locally recessed to permit said leg portions of said staple to pass therepast without snagging therewith as said staple is pried loose from said document; and a body about and joined to said wedge, said body being of an ergonomic size and shape for being hand-held, and said body having a bin section for collecting said staple when freed from said document and further having an enclosed clearance extending from said top bearing surface to said bin section for passage of said [freed] staple thereto and thereinto, when the staple remover is manipulated to tilt front end upwardly immediately as the staple is freed;

wherein said body includes a nose section forwardly of said [wedge] leading edge, and a staple-receiving pocket is defined into the bottom of said nose section just forwardly of said [wedge] leading edge for positioning the [staple's] top horizontal section thereinto for said [wedge] leading edge to be pried forwardly therebeneath;

wherein said [staple remover] body is adapted to permit visual assurance of positioning said staple in said *staple-receiving* pocket from above the *staple* remover without defining an opening of a type that would inadvertently permit escape therethrough of a freed staple; and wherein said [staple remover] body further comprises a flat smooth-bottomed skirt along and outwardly from said [wedge] side surfaces a small distance, whereby the staple remover is easily glided along said document during staple removal.

*27. A staple remover for removing a staple from a document or the like, comprising:*

*a body having an enclosed clearance and a bin section positioned below a rearward end of the enclosed clearance to receive said staple when freed from said document; and*

*a wedge positioned along the body and having:*

*a leading edge laterally dimensioned to be less than the distance between leg portions of the staple and having a thickness sufficiently small and otherwise appropriately shaped to be easily urged under a top horizontal section of said staple to initiate staple removal as the staple remover is urged forwardly along said document; and*

*at least one respective site spaced a selected distance rearwardly from the leading edge whereat side surfaces are locally recessed to permit said leg portions*

*of said staple to pass therepast without snagging, each said side surface at said at least one site is locally rounded and/or angled upwardly and inwardly, defining a non-snagging surface thereat.*

*28. The staple remover of claim 27, wherein the side surfaces are a pair of vertical side surfaces extending from the leading edge of the wedge and spaced apart a distance less than said distance between said leg portions of said staple and also extending rearwardly from said leading edge and positioned substantially in parallel with respect to each other.*

*29. The staple remover of claim 28, further comprising a top bearing surface extending rearwardly and upwardly from the leading edge.*

*30. The staple remover of claim 29, wherein a height of the top bearing surface increases rearwardly from the leading edge.*

*31. The staple remover of claim 30, wherein the top bearing surface includes an inclined surface.*

*32. The staple remover of claim 31, wherein the inclined surface has an angle of from 5 to about 25 degrees.*

*33. The staple remover of claim 32, wherein the angle is between 8 and 18 degrees.*

*34. The staple remover of claim 27, further comprising a lid pivotally or removably attached to the bin section.*

*35. A staple remover for removing a staple from a document or the like, comprising:*

*a wedge having:*

*a leading edge laterally dimensioned to be less than the distance between leg portions of the staple and having a thickness sufficiently small and otherwise appropriately shaped to be easily urged under a top horizontal section of said staple to initiate staple removal as the staple remover is urged forwardly along said document;*

*a pair of vertical side surfaces extending from the leading edge and spaced apart a distance less than said distance between said leg portions of said staple and also extending rearwardly from said leading edge and positioned substantially in parallel with respect to each other; and*

*a bin section positioned below the pair of vertical side surfaces to receive said staple when freed from said document and further having an enclosed clearance for passage of said staple from the pair of vertical side surfaces and covered by a removable and replaceable cover by which said staple remover may be emptied of freed staples; and*

*at least one respective site spaced a selected distance rearwardly from the leading edge whereat side surfaces are locally recessed to permit said leg portions of said staple to pass therepast without snagging.*

*36. The staple remover of claim 35, further comprising a top bearing surface extending rearwardly and upwardly from the leading edge.*

*37. The staple remover of claim 36, wherein a height of the top bearing surface increases rearwardly from the leading edge.*

*38. The staple remover of claim 37, wherein the top bearing surface includes an inclined surface.*

*39. The staple remover of claim 38, wherein the inclined surface has an angle of from 5 to about 25 degrees.*

*40. The staple remover of claim 39, wherein the angle is between 8 and 18 degrees.*

*41. The staple remover of claim 35, further comprising a lid traversing an exterior opening of said bin section and is pivotally or removably attached to the bin section.*

*42. A staple remover for removing a staple from a document or the like, comprising:*

*a body having a bin section;*

*a wedge operatively associated with said body, said wedge having a leading edge and also having a bearing surface extending from said leading edge, all for prying a said staple from a said document by lifting said staple from said document as said wedge is urged forwardly against and over said document and under said staple; and*

*at least one respective site spaced a selected distance rearwardly from the leading edge whereat side surfaces are locally recessed to permit said leg portions of said staple to pass therepast without snagging;*

*said body further having an enclosed clearance therewithin adjacent said bearing surface, said enclosed clearance being in communication with said bin section such that a said staple that has been removed from said document by said bearing surface of said wedge, will enter said enclosed clearance and follow said enclosed clearance to and into said bin section,*

*whereby a staple thus removed from a said document remains contained within said staple remover;*

*wherein said body includes a nose section just forwardly of said leading edge, and a staple-receiving pocket is defined into a document-adjacent opening of said nose section just forwardly of said leading edge for positioning a horizontal section of said staple for said leading edge to be pried forwardly therebeneath.*

*43. The staple remover of claim 42, wherein said bin section has an exterior opening and having a lid traversing said exterior opening and removable from said exterior opening, thereby accessing said bin section for emptying the said staples collected therein from time to time, and said lid being replaceable to reclose said bin section.*

*44. The staple remover of claim 42, wherein said wedge and said enclosed clearance are free of any obstructions upon which said staple may snag.*

*45. The staple remover of claim 42, wherein said body is of an ergonomic size and shape for being hand-held.*

*46. The staple remover of claim 42, wherein said wedge includes a document-adjacent surface that is generally planar and said body has a generally planar bottom surface that is generally coplanar with said bottom surface of said wedge.*

*47. The staple remover of claim 42, wherein said wedge includes a document-adjacent surface that is concave or scalloped.*

*48. The staple remover of claim 42, wherein said body is adapted to permit visual assurance of positioning said staple in said staple-receiving pocket.*

*49. A staple remover for removing a staple from a document or the like, comprising*

*a body having a bin section and a leading end; and*

*a wedge having a trailing end affixed to said body and positioned therealong, and extending to a leading edge of said wedge, said wedge having a document-adjacent surface and a bearing surface with both coextending toward said trailing end, and side surfaces coextending from said document-adjacent surface to said bearing surface, said wedge being free of any portions upon which a said staple may snag during removal; and*

*at least one respective site spaced a selected distance rearwardly from the leading edge whereat side surfaces are locally recessed to permit said leg portions of said staple to pass therepast without snagging;*

*wherein said leading edge is appropriately dimensioned and shaped to be easily urged under a horizontal section of said staple to initiate staple removal as said staple remover is urged forwardly along and adjacent said document when said staple remover is in a first orientation, whereby said staple once removed from said document is constrained to remain within said staple remover prior to being collected in said bin section,*

*said body having an enclosed clearance therewithin adjacent said bearing surface, with said enclosed clearance extending from said bearing surface to and in communication with said bin section such that a said staple that has been removed from said document by said wedge may freely follow said enclosed clearance to and into said bin section when said body is then oriented when in a second orientation to have said leading end thereof upraised such that said enclosed clearance slopes downward toward and to said bin section, said enclosed clearance also being free of any obstructions upon which said staple may snag;*

*wherein said body includes a nose section just forwardly of said leading edge, and a staple-receiving pocket is defined into the document-adjacent surface of said nose section just forwardly of said leading edge for positioning the horizontal section of said staple for said leading edge to pry said staple from said document when said wedge is urged forwardly therebeneath.*

*50. The staple remover of claim 49, wherein said bin section has an exterior opening and having a lid traversing said exterior opening, said lid being removable from said exterior opening thereby accessing said bin section, for emptying freed staples collected therein from time to time, and said lid being replaceable to reclose said bin section.*

*51. The staple remover of claim 49, wherein said wedge and said enclosed clearance are free of any obstructions upon which said staple may snag.*

*52. The staple remover of claim 49, wherein said document-adjacent surface of said wedge is concave or scalloped.*

*53. The staple remover of claim 49, wherein said document-adjacent surface of said wedge is generally planar and said body has a generally planar document-adjacent surface that is generally coplanar with said document-adjacent surface of said wedge.*

*54. The staple remover of claim 49, wherein said body is of an ergonomic size and shape for being hand-held.*

*55. The staple remover of claim 49, wherein said body is adapted to permit visual assurance of positioning said horizontal section of said staple in said staple-receiving pocket when said staple remains attached to said document.*

*56. A staple remover for removing a staple from a document or the like, comprising:*

*a wedge having a leading edge for prying beneath a staple's horizontal section between a staple's leg portions, a top bearing surface to pry said staple upwardly when the staple remover is urged forwardly, and at least one site a selected distance rearwardly where side surfaces of said wedge are locally recessed to pass said staple's leg portions generally vertically therepast without snagging therewith during a removal of said staple from the document and when said staple is freed from the document, wherein said staple remover is free of staple leg-gripping portions; and*

*a body about and joined to said wedge, said body being of an ergonomic size and shape for being hand-held, and said body having a bin section for collecting said staple when freed from said document and further having an enclosed clearance extending from said top bearing surface to said bin section for passage of said staple thereto and thereinto, when the staple remover is manipulated to tilt front end upwardly immediately as the staple is freed;*

*wherein said bin section includes an opening covered by a removable and replaceable cover by which said staple remover may be emptied of freed staples.*

*57. The staple remover of claim 56, wherein said body further includes a nose section forwardly of said leading edge, and a staple-receiving pocket is defined into the bottom of said nose section just forwardly of said leading edge for positioning the staple's horizontal section thereinto for said leading edge to be pried forwardly therebeneath.*

*58. A staple remover for removing a staple from a document or the like, comprising:*

*a wedge having a leading edge for prying beneath a staple's horizontal section between a staple's leg portions, a top bearing surface to pry said staple upwardly when the staple remover is urged forwardly, and at least one site a selected distance rearwardly where side surfaces of said wedge are locally recessed to pass said staple's leg portions generally vertically therepast without snagging therewith during a removal of said staple from the document and when said staple is freed from the document, wherein said staple remover is free of staple leg-gripping portions; and*

*a body about and joined to said wedge, said body being of an ergonomic size and shape for being hand-held, and said body having a bin section for collecting said staple when freed from said document and further having an enclosed clearance extending from said top bearing surface to said bin section for passage of said staple thereto and thereinto, when the staple remover is manipulated to tilt front end upwardly immediately as the staple is freed;*

*wherein the staple remover is tethered to a relatively flat platform for supporting a said document during staple removal.*

*59. A staple remover for removing a staple from a document or the like, comprising: a wedge having a leading edge for prying beneath a staple's horizontal section between a staple's leg portions, a top bearing surface to pry said staple upwardly when the staple remover is urged forwardly, and at least one site a selected distance rearwardly where side surfaces of said wedge are locally recessed to pass said staple's leg portions generally vertically therepast without snagging therewith during a removal of said staple from the document and when said staple is freed from the document, wherein said staple remover is free of staple leg-gripping portions;*

*wherein said wedge is affixed to a body section that includes a bin section beneath said wedge, with said wedge inverted and having said top bearing surface facing downwardly toward said bin section, for a said document to be urged over said wedge for prying and freeing a said staple, which then falls into said bin section, and said body section is nestable into a ballast or the like for securing the staple remover against movement during staple removal.*

*60. The staple remover of claim 7, wherein said body is adapted to permit visual assurance of positioning said staple in said staple-receiving pocket from above the staple*

*remover without defining an opening of the type that would inadvertently permit escape therethrough of a freed staple.*

* * * * *